United States Patent [19]

Shook, Jr. et al.

[11] 3,903,120

[45] Sept. 2, 1975

[54] PREPARATION OF ZEROVALENT NICKEL COMPLEXES FROM ELEMENTAL NICKEL

[75] Inventors: Howard E. Shook, Jr., Orange, Tex.; John B. Thompson, Wilmington, Del.

[73] Assignee: E. I. Du Pont de Nemours and Company, Wilmington, Del.

[22] Filed: Dec. 13, 1973

[21] Appl. No.: 424,364

Related U.S. Application Data

[63] Continuation-in-part of Ser. No. 371,501, June 19, 1973, abandoned.

[52] U.S. Cl. ...... 260/439 R; 252/431 P; 252/431 N; 260/465.3; 260/346.8
[51] Int. Cl. ............................................ C07f 15/04
[58] Field of Search ...................... 260/439 R, 346.8

[56] References Cited
UNITED STATES PATENTS

| | | |
|---|---|---|
| 3,631,191 | 12/1971 | Kane et al. ...................... 260/439 R |
| 3,642,658 | 2/1972 | Allum et al. ...................... 252/431 P |
| 3,671,560 | 6/1972 | Fahey .............................. 260/439 R |
| 3,766,231 | 10/1973 | Gosser et al. .................... 260/439 R |
| 3,808,246 | 4/1974 | Fahey ............................. 260/439 R |

*Primary Examiner*—Arthur P. Demers

[57] ABSTRACT

Zerovalent nickel complexes of the types $Ni(MZ_3)_4$ and $Ni(MZ_3)_2A$; wherein M is P, As or Sb, Z is R or OR, R is an alkyl or aryl radical having up to 18 carbon atoms and may be the same or different, and at least one Z is OR, A is a monoolefinic compound having 2 to 20 carbon atoms, the R radicals of a given $MZ_3$ of $Ni(MZ_3)_2A$ preferably being so chosen that the ligand has a cone angle of at least 130°; are prepared by reacting elemental nickel with the $MZ_3$ ligand at a temperature in the range of 0°C.–150°C. in the presence of a halogen containing derivative of $MZ_3$ as a catalyst. A more rapid reaction is realized by carrying out the preparation in an organonitrile solvent.

14 Claims, No Drawings

PREPARATION OF ZEROVALENT NICKEL COMPLEXES FROM ELEMENTAL NICKEL

CROSS REFERENCE TO RELATED APPLICATION

This is a continuation-in-part of patent application Ser. No. 371,501, filed on June 19, 1973 by Howard E. Shook, Jr. and John B. Thompson, now abandoned.

BACKGROUND OF THE INVENTION

This invention is concerned with preparation of zerovalent nickel complexes. It is well known that the zerovalent nickel complex, nickel carbonyl, can be produced in high yield by conducting carbon monoxide over finely-divided nickel in a carefully controlled temperature range. As reported in the literature L. D. Quin, J.Am. Chem. Soc, 79, 3681 (1957) reaction of $CH_3PCl_2$ with elemental nickel gives a good yield of the complex $Ni(CH_3PCl_2)_4$ but phosphorus compounds such as $PCl_3$ and $C_6H_5PCl_2$ were observed not to react with elemental nickel. Similarly aryl-substituted phosphorus compounds such as $o-C_6H_4[P(C_2H_5)_2]_2$, $C_2H_4[P(C_6H_5)_2]_2$ and $o-C_6H_4[P(C_6H_5)_2]_2$ have been reported to give only low yields of zerovalent nickel complexes on reaction with elemental nickel [Chatt et al., J. Chem. Soc. 1378 (1960); 5504 (1961)].

Because of the growing interest in zerovalent nickel complexes, especially those of aromatic phosphorus compounds as catalysts in oligomerization and hydrocyanation reactions, an improved method for the systhesis of these valuable complexes has been sought.

SUMMARY OF THE INVENTION

An improved process has been found for the synthesis of zerovalent complexes of nickel with a ligand such as $MZ_3$ wherein M is P, As or Sb, Z is R or OR and R is an alkyl or aryl group having up to 18 carbon atoms and the R's of a given ligand may be the same or different, and at least one Z is OR. The process comprises reacting the ligand with elemental nickel, preferably in finely-divided form at a temperature in the range of 0°C.–150°C., preferably 25°–100°C., in the presence of at least 5 mpm (moles per million moles), preferably at least 50 mpm, based on the ligand, of a catalyst of the formula $(R'O)_xR''_yMX_z$ wherein M is as defined above, R' and R'' are alkyl or aryl radicals having up to 18 carbon atoms, may be the same or different, $x$ and $z$ have a value of 1–2, $y$ is 0 or 1 and the sum of $x$, $y$ and $z$ is 3 and wherein X is a halide of the group consisting of chloride, bromide and iodide.

The reaction can be carried out using an excess of the ligand as a solvent. A more rapid reaction rate is realized if an organic mononitrile or dinitrile is used as solvent. Typical organic nitriles which can be used include acetronitrile, acrylonitrile, 3-pentenenitrile, methylglutaronitrile and adiponitrile. Any organic nitrile which is liquid under the reaction conditions can be used. Cosolvents which are compatible with the organic nitriles such as benzene, toluene, xylenes, cresols, cyclohexane or dioxane can also be employed. The reaction is carried out batch-wise or continuously at atmospheric or superatmospheric pressure in an inert atmosphere such as nitrogen, carbon dioxide, or other inert gas such as helium, neon, argon or kypton.

One type of zerovalent nickel complex that can be made by the process of this invention is that of the formula $Ni(MZ_3)_4$ wherein $MZ_3$ is as defined above. Typical ligands of the formula $MZ_3$ include the group consisting of $P(OC_6H_5)_3$, $P(O-m-C_6H_4CH_3)_3$, $P(O-p-C_6H_4CH_3)_3$, $P(O-m$ & $p-C_6H_4CH_3)_3$, as well as $P(O-C_2H_5)_3$, $P(O-C_4H_9)_3$, $C_6H_5P(O-C_6H_5)_2$, $(C_6H_5)_2POC_6H_5$, $As(OC_6H_5)_3$, $As(O-m$ & $p-C_6H_4CH_3)_3$, $Sb(OC_6H_5)_3$ and $Sb(O-m$ & $p-C_6H_4CH_3)_3$. Corresponding zerovalent nickel complexes include $Ni[P(OC_6H_5)_3]_4$, $Ni[P(O-m-C_6H_4CH_3)_3]_4$, $Ni[P(O-p-C_6H_4CH_3)_3]_4$, $Ni[P(O-m$ & $p-C_6H_4CH_3)_3]_4$, $Ni[P(C_6H_5)(OC_6H_5)_2]_4$, $Ni[P(C_6H_5)_2(O-C_6H_5)]_4$, $Ni[P(OC_2H_5)_3]_4$, $Ni[P(OC_4H_9)_3]_4$, $Ni[As(OC_6H_5)_3]_4$, $Ni[Sb(OC_6H_5)_3]_4$, $Ni[As(O-m$ & $p-C_6H_4CH_3)_3]_4$ and $Ni[Sb(O-m$ & $p-C_6H_4CH_3)_3]_4$.

Another type of zerovalent nickel complex that can be made by the process of this invention is that of the formula $Ni(MZ_3)_2A$ wherein $MZ_3$ is defined as above and A is a monoolefinic organic compound with no other carbon-carbon unsaturation and having from 2 to 20 carbon atoms. It is preferred that the R radicals of a given $MZ_3$ ligand be so chosen that the ligand has a cone angle of at least 130°, and that the carbon-carbon double bond of A be conjugated with a strong electronegative radical such as carbonyl or nitrile, as in maleic anhydride, fumaronitrile or acrylonitrile. The cone angle as referred to above is determined as described by C. A. Tolman in J. Am. Chem. Soc., 92 2956 (1970). Olefins such as ethylene, propylene, butylene and the like, as well as the olefinic compounds noted above, can be used. Phosphorus ligands fulfilling the requirement of having a cone angle of at least 130° include tri-o-tolyl phosphite, tri-(2,5-xylyl)phosphite, tri-(2,4-xylyl)phosphite, tri-o-phenylphenyl phosphite, diphenyl phenyl phosphonite, di-o-tolyl phenyl phosphonite and phenyl diphenyl phosphinite. Preferred zerovalent nickel complexes include $Ni[P(O-o-C_6H_4CH_3)_3]_2[C_2H_4]$, $Ni[P(O-o-C_6H_4CH_3)_3]_2[C_4H_2O_3*]$, $Ni[P(O-o-C_6H_4CH_3)_3]_2[C_4H_2N_2**]$ and $Ni[P(O-o-C_6H_4CH_3)_3]_2-[CH_2\!\!=\!\!CH\!\!-\!\!CN]$.

*$C_4H_2O_3$ = maleic anhydride; ** fumaronitrile

Under hydrocyanation conditions in the presence of compounds to be hydrocyanated such as 3-pentenenitrile (3PN) these complexes can be readily trannsformed to complexes of the type $Ni[(O-o-C_6H_4CH_3)_3]_3[NC-CH_2-CH\!\!=\!\!CH-CH_3]$ and $Ni[O-o-C_6H_4CH_3]_2[CH_3CH\!\!=\!\!CH-CH_2CN]$ depending on whether the 3PN is coordinated with zerovalent nickel through the nitrile or olefin moiety.

Zerovalent nickel complexes of the type $Ni(MZ_3)_2A$ or mixtures of types $Ni(MZ_3)_2A$ and $Ni(MZ_3)_4$ can be produced by the process of this invention when $MZ_3$ is a phosphorus ligand such as mixed tri-, meta- and paratolyl phosphite wherein the cone angle is less than 130°. With these complexes also it is preferred that the carbon-carbon double bond of A be conjugated with a strong electronegative radical such as carbonyl or nitrile.

Zerovalent complexes of the types described above wherein the R radicals of a given $MZ_3$ ligand are different can also be produced by the process of this invention. Illustrative ligands of this type include such phosphorus ligands as di-o-tolyl phenyl phosphite, di-o-tolyl p-tolyl phosphite, di-o-tolyl m-tolyl phosphite, o-tolyl diphenyl phosphite, o-tolyl di-p-tolyl phosphite or o-tolyl di-m-tolyl phosphite wherein the cone angle of the given ligand is greater than 130° as well as phosphorus ligands wherein the cone angle is less than 130° such as diphenyl p-tolyl phosphite, diphenyl m-tolyl phosphite, phenly di-p-tolyl phosphite or phenyl di-m-tolyl phosphite. Preparation of zerovalent complexes of this type are illustrated in Example 54.

The reaction can be carried out with a stoichiometric amount of nickel with respect to the phosphorus ligand or a deficiency or excess of nickel can be used. In general, it is observed that a more rapid reaction rate is realized when an excess of nickel is employed.

As noted above, it is preferred that the nickel be in finely-divided form so as to provide a high surface area for reaction. Suitable nickel sources for this purpose include those made available by International Nickel Company (INCO) under the designations "Chemical Grade" and Specimen Nos. 123, 128 and 255. Raney nickel or other forms of elemental nickel such as that produced from a hydrogen reduced nickel compound can be used. As will be apparent to one skilled in the art, the surface of the nickel is preferably clean, i.e., free of oxygen or other material.

It is preferred to carry out the reaction using an organic nitrile as a solvent. Best results are obtained with a mole ratio of organic nitrile to nickel of at least 0.5. A considerable excess of the organic nitrile can be used, the main consideration being one of economics. Ordinarily the amount would be in the mole ratio of 0.5–20.

The catalyst compounds $(R'O)_xR''_nMX_z$ can be preformed or they can be prepared in situ by reaction of an appropriate ligand, i.e., a ligand having at least two ROM linkages, with a suitable halide source as an initiator such as a halide or alkyl-substituted halide of phosphorus, arsenic or antimony such as $CH_3PCl_2$, $CH_3AsCl_2$ or $CH_3SbCl_2$, an appropriate metal halide, elemental halogen such as chlorine, bromine or iodine or the corresponding hydrogen halide or thionyl halide. Suitable metal halides for this purpose include those of Cr, Ni, Ti, Cu, Co, Fe, Hg, Sn, Li, K, Ca, Ba, Sc, Ce, V, Mn, Be, Ru, Rh, Pd, Zn, Cd, Al, Th, Zr, and Hf. The halide can be chloride, bromide or iodide. Particularly suitable halide sources include $PX_3$, $TiX_4$, $ZrX_4$, $HfX_4$ and HX where X is chloride, bromide or iodide. Mixtures of two or more initiators or catalyst can be used in carrying out the reaction.

The zerovalent nickel complexes produced by the process of this invention are especially useful as catalysts, in particular, for the hydrocyanation of olefins.

DESCRIPTION OF PREFERRED EMBODIMENTS

The invention is more fully illustrated in the examples to follow. In the examples to be described below the reactions are carried out in an inert atmosphere such as nitrogen in a 300 ml. flask fitted with magnetic stirrer, condenser and thermometer. The apparatus was first purged with dry nitrogen and the reactants under a nitrogen blanket were charged to the flask and continued under nitrogen during reaction. The liquid reaction products were recovered from the flask under vacuum through a Buchner funnel attached to the bottom of the flask and analyzed for total nickel and for zerovalent nickel. Total nickel can be determined by dissolving the sample in aqueous solvent after fusion with phosphorus pyrosulfite or by dissolving the sample directly in methanol and thereafter determining nickel by atomic absorption spectroscopy. The zerovalent nickel can be determined by gel permeation chromatography. The zerovalent nickel complexes have a much higher molecular weight (and size) than any other component in the reaction medium. This fact forms the basis for the separation of the complexes from low molecular weight species by gel permeation chromatography on a crosslinked polystyrene gel. Quantitative determination is carried out using a previously determined calibration plot for the complex. For certain complexes such as $Ni(MZ_3)_2A$, the analysis is carried out after reaction with carbon monoxide to form the more stable complex $Ni(MZ_3)_2(CO)_2$.

Examples 1–4 illustrate the preparation of zerovalent nickel complexes of the type $Ni(PZ_3)_4$ with Example 4 depicting in situ preparation of the catalyst for the reaction. The preparation of complexes of the type $Ni(PZ_3)_2A$ is illustrated in Examples 5–8 as well as the in situ preparation of the catalyst for the reaction, with preparation of the catalyst in particular shown in Examples 9–11. Preparation of complexes embracing both $Ni(PZ_3)_4$ and $Ni(PZ_3)_2A$ types is shown in Example 12.

EXAMPLE 1 - TETRAKIS(TRI-M & P-TOLYLPHOSPHITE)NICKEL(O)

A. Three grams of finely-divided nickel powder (INCO Chemical Grade), 40 grams of 3-pentenenitrile, 80 grams of undistilled mixture of meta- and paratritolyl phosphite containing an estimated 1190 ppm of (m & p—$CH_3C_6H_4O)_2PCl$ based on weight of the tritolyl phosphite, which was produced during manufacture of the tritolyl phosphite, were weighed out and transferred to the reator under dry nitrogen. The nitrogen purge was maintained while the reaction mixture was rapidly heated to 100°C. and maintained at that temperature for four hours with stirring. The heating was stopped and the reactor was cooled to bring the temperature of the reaction mixture to about 50°C. The nitrogen purge was stopped; the reaction product withdrawn from the reactor through the Buchner funnel weighed 119. g. Concentration of Ni[PO—m & p—$C_6H_4$—$CH_3)_3]_4$ was 45.3% corresponding to a conversion of nickel powder to zerovalent nickel in solution of 72%.

B. The reactants described above, except for omission of 3-pentenenitrile, were reacted at 100°C. for four hours. The filtered product weighed 76.63 g. Concentration of Ni[P(O—m & p—$C_6H_4CH_3)_3]_4$ was 3.9%.

EXAMPLE 2 - TETRAKIS(TRI-M & P-TOLYL PHOSPHITE)NICKEL(O)

Following the procedure of Example 1, the same reactants along with 0.2 g. of $NiCl_2$ and 0.2 g. of $ZnCl_2$ were reacted at 80°C. for four hours. The filtered product weighed 119.69 g. Concentration of Ni[P(O—m & p—$C_6H_4CH_3)_3]_4$ was 47.4%, corresponding to -TETRAKIS(TRIPHENYL of elemental nickel to soluble zerovalent nickel of 76%.

EXAMPLE 3 TETRAKIS(TRI-M & P-TOLYL PHOSPHITE)NICKEL(O)

The reactants described in Exammple 1, except for substitution of acetonitrile for 3-pentenenitrile, were reacted at 78°C. for four hours. The filtered product weighed 113.42 g. Concentration of Ni[P(O—m & p—$C_6H_4CH_3)_3]_4$ was 51.8%, corresponding to 78% conversion of elemental nickel to soluble zerovalent nickel.

EXAMPLE 4 - ETRAKIS(TRIPHENYL PHOSPHITE)NICKEL(O)

Into a one-liter flask fitted with a high-speed stirrer and addition funnel and previously evacuated and flushed with nitrogen there was introduced 1.5 gram of Randy nickel slurry (50% Ni in water). The flask was evacuated (0.2 mm, 40°C., 20 minutes) to remove water after which 68 ml. of redistilled triphenyl phosphite was added, the reaction mixture was blanketed with dry nitrogen and brought to 110°C. over a period of about 35 minutes and held at a temperature of 110°–120°C. for two hours. To the mixture there was added 100 ml. of 3-pentenenitrile, the mixture was reheated to 110°–120°C. and held in that range for two hours. The reaction mixture was cooled to room temperature and examined. No evidence of reaction was observed.

About 0.5 g. of substantially anhydrous zinc chloride was added to the reaction mixture, after which it was heated to 110°–125°C. under nitrogen for three hours, then cooled to room temperature. The liquid product was decanted off the nickel powder and placed in a bottle and blanketed with nitrogen. Within about 20 minutes white crystals of $Ni[P(OC_6H_5)_3]_4$ separated from the liquid.

EXAMPLE 5 - MALEIC ANHYDRIDE [BIS-(O-TRITOLYL PHOSPHITE)]NICKEL(O)

This example illustrates the preparation of a zerovalent nickel complex from a bulky ligand, tri-o-tolyl phosphite, (cone angle 141°) in the added presence of an olefinic compound, maleic anhydride, and further illustrates the in situ preparation of the required catalyst for carrying out the reaction.

An acetonitrile (25 ml) solution of 4.9 g. maleic anhydride, 30 ml. tri-o-tolyl phosphite (o-TTP), 3 g. nickel powder, and 0.13 g. $TiCl_4$ was stirred under nitrogen for 20° hours at 65°C. The reaction flask was cooled to 0°C. for two hours, and the crude complex was filtered off. The complex was dissolved in 50 ml. hot toluene and filtered through a medium frit. Thereafter the complex was precipitated by addition of 200 ml. of methanol, the residue after filtration was washed well with toluene to yield 27.2 g. of purified complex $Ni[P(O-o-C_6h_4CH_3)_3]_2[C_4H_2O_3]$, corresponding to a 63% yield. Ni(O) (calculated): 6.8%; Found 6.6%; Total Ni (calculated): 6.8%; Found: 6.8%. An amount of 0.59 g. of unconverted nickel was recovered. Conversion of nickel powder to zerovalent nickel complex was 80%.

The effect of using even smaller amounts of initiator in the in situ preparation of the catalyst for the above reaction is illustrated in the following experiments. In these a 125 ml. flask was charged with 1.0 g. of nickel powder (prepared by hydrogen reduction of nickel oxide), 20 ml. of o-TTP, 10 ml. of acetonitrile, 1.0 g. of maleic anhydride and the amounts or $TiCl_4$ (microliters) shown in the table below. The mixture was stirred under nitrogen for 36 hours at 65°C. and was then worked up as described above. The results are shown in tabular form below.

| Exp. | $TiCl_4$ | Catalyst (mpm)* | Total Ni (Wt. %) | Ni(O) (Wt. %) |
|---|---|---|---|---|
| 1 | 3     | 1000 | 1.87 | 1.42 |
| 2 | 0.3   | 100  | 1.25 | .94  |
| 3 | 0.03  | 10   | .14  | .13  |
| 4 | 0.003 | 1    | .12  | —    |
| 5 | 0     | 0    | .43  | —    |

*Moles per million moles — based on weight of phosphorus ligand

In an additional experiment a reaction mixture consisting of 1.0 g. nickel powder, 10 ml. of acetonitrile, 20 ml. of o-TTP and 1.0 g. of maleic anhydride, but with no $TiCl_4$, was stirred for 18 hours at 20°C; analysis showed no detectable amount of total nickel or zerovalent nickel.

EXAMPLE 6 - ACRYLONITRILE[BIS(O-TRITOLYLPHOSPHITE)]NICKEL (O)

Following the procedure of Example 5, a reaction mixture of 1.0 g. nickel powder, 20 ml. of o-TTP, 10 ml. of acetonitrile and 0.05 g. of iodine was stirred for different time periods at 20°C., samples were withdrawn and analyzed. The results were as follows:

| Time | Nickel | Conversion To Complex |
|---|---|---|
| 16 hours | Total — 0.36% by wt. Ni(O) — 0.19 | 5.7% |
| 40 hours | Total — 0.71 Ni(O) — 0.54 | 16 |
| 112 hours | Total — 1.51 Ni(O) — 1.08 | 32 |

An infrared analysis of a solution of the reaction mixture prepared as described above showed an absorption band at 2200 $cm^{-1}$, corresponding with that of an authentic sample of acrylonitrile [bis(tri-o-tolylphosphite)]nickel (O).

EXAMPLE 7 - FUMARONITRILE[BIS(TRI-O-TOLYLPHOSPHITE)]NICKEL (O)

Following the procedure of Example 5, a reaction mixture of 1.0 g. of nickel powder, 10 ml. of acetonitrile, 21 ml. of o-TTP, 3.0 g. of fumaronitrile and 0.017 g. of $TiCl_4$ was heated under nitrogen at 60°C. for 18 hours with stirring, then worked up and analyzed. Total nickel was found to be 0.72% and zerovalent nickel 0.54%, corresponding to a 17% conversion of nickel powder to fumaronitrile [bis(tri-o-tolyl phosphite)]nickel (O).

EXAMPLE 8 - ETHYLENE[BIS(TRI-O-TOLYLPHOSPHITE)]NICKEL (O)

A 10 ml. pressure tube was charged with 0.5 g. of nickel powder, 3 ml. of o-TTP, 1.5 ml. of acetonitrile and 0.04 g. of $TiBr_4$. The tube was pressured with 1000 atmospheres of ethylene, heated at 65°C. for 16 hours after which the tube contents were worked up and analyzed. Zerovalent nickel was found to be 0.1%.

The preparation of the required catalyst used for the synthesis of the zerovalent nickel complexes from elemental nickel is also illustrated in Examples 9–11.

EXAMPLE 9 - TICL₄ WITH O-TRITOLYL PHOSPHITE

Titanium tetrachloride (1.4 g. – 0.007 mole) was added to 3 g. (0.008 mole) of o-tritolyl phosphite (o-TTP) at room temperature. Analysis of the mixture within 5 minutes by $^{31}$P NMR spectroscopy showed that all of the o-TTP had reacted with both o-tolyl phosphorodichloridite (o-CH₃C₆H₄OPCl₂) and o-ditolyl phosphorochloridite (o-CH₃C₆H₄O)₂PCl) being detected.

EXAMPLE 10 - ZRCL₄ WITH O-TRITOLYL PHOSPHITE

Zirconium tetrachloride (0.12 g. – 0.0005 mole) was added to 3 g. (0.008 mole) of o-TTP. The mixture was heated to effect solution of the ZrCl₄ after which the mixture was held at 94°C. for 30 minutes. Analysis of the mixture by $^{31}$P NMR showed an area ratio of (o-CH₃C₆H₄O)₂PCl/ o-TTP of 1/4.7, compared with a theoretical area ratio of 1/3 if all the ZrCl₄ had reacted.

EXAMPLE 11 - HFCL₄ WITH O-TRITOLYL PHOSPHITE

Hafnium tetrachloride (0.16 g. – 0.0005 mole) was added to 3 g. (0.008 mole) of o-TTP, the mixture was heated to effect solution of the HfCl₄ and thereafter held at 94°C. for 30 minutes. Analysis by $^{31}$P NMR showed a o-CH₃C₆H₄O)₂PCL/ o-TTP area ratio of 1/10.5, compared with a theoretical area ratio of 1/3 if all HfCl₄ had reacted.

EXAMPLE 12 - TETRAKIS(TRI-M & P-TOLYL PHOSPHITE)NICKEL(O) AND MALEIC ANHYDRIDE [BIS-(TRI-M & P-TOLYL PHOSPHITE)]NICKEL(O)

To a 125 ml. flask there was charged and mixed under nitrogen at 25°C. one gram of INCO chemical grade nickel powder, two grams of maleic anhydride, 20 grams 3-pentenenitrile and 12 grams of mixed meta- and paratritolyl phosphite containing an estimated 800 ppm of (m & p—CH₃C₆H₄O)₂PCl based on the weight of the tritolyl phosphite. Mixing under nitrogen was continued for 46 hours, at which time a sample removed for analysis showed 1.29 weight percent of nickel(O), corresponding to a 44% conversion of nickel powder to zerovalent nickel in solution. On further mixing to a time of 115 hours analysis showed 1.81 weight percent of nickel(O), corresponding to a 61% conversion of nickel powder to zerovalent nickel in solution. Analysis by $^{31}$P NMR showed both Ni[P(O—m & p—C₆H₄CH₃)₃]₄ and Ni[P(O—m & p—C₆H₄CH₃)₃]₂[C₄H₂O₃*] to be present.

*C₄H₂O₃ = maleic anhydride

The experiments summarized in Table I further illustrate the in situ preparation of the required catalyst for synthesis of the zerovalent nickel complexes from elemental nickel.

In Table I the following abbreviations are used: PTTP, tri-p-tolyl phosphite; OTTP, tri-o-toyl phosphite; TTP, mixed tri-meta- and para-tolyl phosphites; 3PN, 3-pentenenitrile; ADN, adiponitrile; MGN, 2-methylglutaronitrile; cyane, cyclohexane. In all of the experiments the amount of finely-divided nickel used was one gram, except in Experiment 25 wherein the designation (a) refers to the fact that the amount used was 1.5 grams. The designation (b) noted in some of the experiments refers to a unit of volume equivalent to one microliter (0.001 ml.).

TABLE I

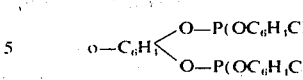

SYNTHESIS WITH IN SITU PREPARED CATALYST

| Exp. | PZ₃ Ligand (g) | Metal Halide (g) | Solvent (ml) | | Temp. (°C) | Time (hrs) | Conversion (%) |
|---|---|---|---|---|---|---|---|
| 1 | PTTP, 7.0 | NiCl₂, 0.2 | CH₃CN, | 25 | Reflux | 16 | 72.4 |
| 2 | " | NiBr₂, 0.03 | " | " | " | 16 | 76.3 |
| 3 | " | NiI₂, 0.04 | " | " | " | 16 | 85.2 |
| 4 | (C₂H₅O)₃P, 4.0 | NiCl₂, 0.02 | " | " | " | 21 | 57.8 |
| 5 | o—C₆H₄⟨O—P(OC₆H₄CH₃)₂ / O—P(OC₆H₄CH₃)₂⟩, 5.0 | " 0.03 | " | " | " | 21 | 38.4 |
| 6 | C₆H₅P(O—CH₂C-H₂—O—CH₃)₂, 5.0 | " | " | " | " | 21 | 34.6 |
| 7 | PTTP, 7.0 | " 0.02 | 3PN | " | 100 | 20 | 20.0 |
| 8 | " | " " | ADN | " | " | 16 | 9.2 |
| 9 | " | " " | n—C₄H₉CN | " | Reflux | 16 | 34.9 |
| 10 | " | " " | MGN | " | 100 | 16 | 22.1 |
| 11 | TTP, 20 | " 0.05 | CH₃CN, Dioxane, | 10 10 | Reflux | 21 | 46.8 |
| 12 | " 10 | " 0.02 | CH₃CN, Cyane, | 10 10 | " | 21 | 34.8 |
| 13 | " 20 | NiCl₂, 0.02 CaCl₂, 0.02 | 3PN, | 10 | 110 | 22 | 11.3 |
| 14 | " | NiCl₂, 0.05 LiCl, 0.02 | 3PN, | 10 | 100 | 22 | 41.1 |
| 15 | " | NiCl₂, 0.05 ZnCl₂, 0.05 | " | " | 100 | 22 | 33 |
| 16 | " 7.0 | LiCl, 0.03 | CH₃CN, H₂O | 25 10(b) | Reflux | 17 | 44.5 |
| 17 | " | KI " | CH₃CN, H₂O | 25 10(b) | " | 18 | 29.4 |
| 18 | " | CaCl₂, 0.02 | CH₃CN, | 25 | " | 15 | 40.8 |
| 19 | " | BaCl₂, 0.04 | " | " | " | 6 | 18.21 |

TABLE I -continued

SYNTHESIS WITH IN SITU PREPARED CATALYST

| Exp. | PZ₃ Ligand (g) | Metal Halide (g) | Solvent (ml) | Temp. (°C) | Time (hrs) | Conversion (%) |
|---|---|---|---|---|---|---|
| 20 | " | Sc₂Cl₂, 0.02 | " | " | 7 | 45.9 |
| 21 | " | CeCl₃, 0.04 | " | " | " | 22 | 47.1 |
| 22 | PTTP, 7.0 | TiCl₄, 0.02 | " | " | " | 20 | 79.4 |
| 23 | " | TiCl₄, 15(b) | " | " | " | 20 | 80.9 |
| 24 | TTP, 7.0 | VCl₄, 0.02 | " | " | " | 7 | 54.7 |
| 25⁽ᵃ⁾ | PTTP, 14.0 | CrCl₃·THF, 0.04 | " | 50 | " | 20 | 45.6 |
| 26 | PTTP, 7.0 | MnCl₂, 0.02 | CH₃CN 25 | " | " | 20 | 5.0 |
| 27 | TTP " | ReCl₅, 0.04 | " | " | " | 21 | 53.4 |
| 28 | " | FeCl₂, 0.02 | " | " | " | 20 | 31.6 |
| 29 | " | FeCl₃, " | " | " | " | 20 | 50.3 |
| 30 | TTP, 7.0 | RuCl₃, 0.05 | " | " | " | 15 | 23.8 |
| 31 | " | RuCl₃·3H₂O, " | " | " | " | 20 | 37.2 |
| 32 | PTTP, 7.0 | CoCl₂, 0.02 | " | " | " | 20 | 12.6 |
| 33 | TTP " | RhCl₃, 0.04 | " | " | " | 19 | 50.7 |
| 34 | " | PdCl₂, " | " | " | " | 19 | 44.1 |
| 35 | PTTP " | CuCl₂, 0.02 | " | " | " | 20 | 71.5 |
| 36 | TTP " | AgCl, 0.04 | " | " | " | 20 | 53.7 |
| 37 | " | ZnCl₂, 0.10 | " | " | " | 19 | 13.5 |
| 38 | " | CdCl₂, 0.03 | " | " | " | 20 | 9.0 |
| 39 | " | Hg₂Cl₂, 0.05 | " | " | " | 20 | 68.2 |
| 40 | " | HgCl₂, " | " | " | " | 20 | 74.9 |
| 41 | TTP, 7.0 | AlCl₃, 0.02 | CH₃CN, 25 | " | " | 20 | 79.7 |
| 42 | " | ThCl₃, 0.04 | " | " | " | 21 | 48.4 |
| 43 | " | SnCl₂, 0.04 | " | " | " | 20 | 5.9 |
| 44 | " | SnCl₄, 0.05 | " | " | " | 20 | 50.1 |
| 45 | " | PCl₃, 20(b) | " | " | " | 16 | 36.3 |
| 46 | " | PCl₅, 0.03 | " | " | " | 16 | 70.3 |
| 47 | " | SbCl₃, 30(b) | " | " | " | 21 | 43.4 |
| 48 | " | I₂, 0.05 | " | " | " | 16 | 68.8 |
| 49 | " | HCl, 20(b) | " | " | " | 25 | 53.0 |
| 50 | " | SO₂Cl₂, 30(b) | " | " | " | 6 | 38.7 |
| 51 | " | C₅H₅N·HBr, 0.02 | " | " | " | 21 | 54.9 |
| 52 | " | C₅H₅N·HCl, 0.02 | " | " | " | 22 | 38.5 |
| 53 | " 10 | NiCl₂, " | CH₃CN, 10 C₅H₅N, 10 | " | " | 21 | 8.1 |

EXAMPLE 54

The preparation of zerovalent complexes of the type Ni(MZ₃)₄ wherein the R radicals of a given MZ₃ ligand are different is illustrated in the several runs of Example 54.

In this example the ligands were triaryl phosphites wherein the R radicals of a given ligand were o-tolyl and phenyl groups.

The required triaryl phosphites were prepared by reacting phosphorus trichloride with a specified mixture of o-cresol and phenol previously dried over a molecular sieve, heating the mixture overnight at 100°C., heating the mixture at 200°C. with a nitrogen purge to remove by-product hydrogen chloride for a further period of 4 to 6 hours or until the chloride level reached a required or desired level.

For preparation of zerovalent nickel complexes from the mixed triaryl phosphite, the mixed triaryl phosphite (100 g) was reacted with 3 g. of nickel powder (Inco Chemical Grade) and 40 g. of 3-pentenenitrile, the mixture being heated for three hours at 80° C. and then held at 35°C. for 16–18 hours. The results obtained with triaryl phosphites prepared with varying amounts of o-cresol and phenol are shown in tabular form below.

Phosphite Preparation

| Run | o—Cresol (Wt %) | Phenol (Wt %) | Cl (ppm) | Ni(O) (Wt %) |
|---|---|---|---|---|
| a | 95 | 5 | 0* | 0.02 |
| b | 80 | 20 | 606 | 0.06 |
| c | 60 | 40 | 399 | 0.82 |
| d | 55 | 45 | 592 | 0.93 |
| e | 36.5 | 63.5 | 290 | 1.28 |

*0.1 g. TiCl₄ added

We claim:

1. A process for the preparation of a zerovalent nickel complex of the group consisting of Ni(MZ₃)₄ and Ni(MZ₃)₂A wherein M is of the group consisting of P, As and Sb, Z is R or OR, R is an alkyl or aryl radical having up to 18 carbon atoms, at least one Z is OR and the R radicals of a given MZ₃ may be the same or different wherein A is a monoolefinic organic compound with no other carbon-carbon unsaturation and having from 2 to 20 carbon atoms, which comprises reacting elemental nickel with a ligand MZ₃ wherein M and Z are as defined above at a temperature in the range of 0°C.–150°C. in the presence of at least 5 moles per million moles, based on amount of the ligand, of a catalyst compound of the formula $(R'O)_xR''_yMX_z$ wherein M is defined as above, R' and R'' are alkyl or aryl radicals having up to 18 carbon atoms, and may be the same or different;

wherein $x$ and $z$ have a value of 1–2, $y$ is 0 or 1, the sum of $x$, $y$ and $z$ is 3; and X is a halide of the group consisting of —Cl, —Br and —I, and wherein for the preparation of Ni(MZ₃)₂A there is also present a monoolefinic organic compound A.

2. The process of claim 1 wherein the reaction is carried out at a temperature in the range of 25°–100°C. and in the added presence of an organonitrile.

3. The process of claim 2 wherein the zerovalent nickel complex is of the formula Ni(PZ₃)₄.

4. The process of claim 3 wherein PZ₃ is a triaryl phosphite.

5. The process of claim 4 wherein the triaryl phosphite is of the group consisting of triphenyl phosphite, tri-p-tolyl phosphite, tri-m-tolyl phosphite and tri(m & p-tolyl) phosphite.

6. The process of claim 2 wherein the catalyst compound $(R'O)_xR''_yMX_z$ is prepared in situ by introducing into the reaction mixture an initiator, the initiator being of the group consisting of halides of P, As and Sb, alkyl substituted halide of P, As and Sb, a halide of a metal, elemental halogen of the group consisting of $Cl_2$, $Br_2$ and $I_2$ and their corresponding hydrogen and thionyl halides.

7. The process of claim 6 wherein the initiator is of the group consisting of $PX_3$, $TiX_4$, $ZrX_4$, $HfX_4$ and $HX$ wherein X is a —Cl, —Br or —I, and $I_2$.

8. The process of claim 2 wherein the zerovalent nickel complex has the formula $Ni(PZ_3)_2A$, wherein the R radicals are so chosen that for a given $PZ_3$ the cone angle is at least 130° and wherein A is a monoolefinic compound with no other carbon-carbon unsaturated having from 2 to 20 carbon atoms.

9. The process of claim 8 wherein A is a monoolefinic organic compound with a strong electronegative group conjugated with the olefin carbon-carbon double bond.

10. The process of claim 9 wherein the monoolefinic organic compound is of the group consisting of maleic anhydride, acrylonitrile and fumaronitrile.

11. The process of claim 10 wherein $PZ_3$ is of the group consisting of tri-o-tolyl phosphite, tri-o-phenylphenyl phosphite, tri-2,5-xylyl phosphite and tri-2,4-xylyl phosphite.

12. The process of claim 11 wherein the catalyst compound $(R'O)_xR''_yMX_z$ is prepared in situ by introducing into the reaction mixture an initiator of the group consisting of $PX_3$, $TiX_4$, $ZrX_4$, $HfX_4$ and $HX$ wherein X is —Cl, —Br or —I and $I_2$.

13. The process of claim 3 wherein the R radicals of a given $PZ_3$ are different and at least one R is an o-tolyl radical.

14. The process of claim 13 wherein the R radicals other than o-tolyl are of the group consisting of phenyl, m-tolyl and p-tolyl radicals.

* * * * *